(12) United States Patent
Mohammadi

(10) Patent No.: US 12,451,183 B2
(45) Date of Patent: Oct. 21, 2025

(54) BURST ACCESS MEMORY AND METHOD OF OPERATING A BURST ACCESS MEMORY

(71) Applicant: XENERGIC AB, Lund (SE)

(72) Inventor: Babak Mohammadi, Lund (SE)

(73) Assignee: XENERGIC AB, Lund (SE)

( * ) Notice: Subject to any disclaimer, the term of this patent is extended or adjusted under 35 U.S.C. 154(b) by 176 days.

(21) Appl. No.: 18/558,695

(22) PCT Filed: May 5, 2022

(86) PCT No.: PCT/EP2022/062099
§ 371 (c)(1),
(2) Date: Nov. 2, 2023

(87) PCT Pub. No.: WO2022/233993
PCT Pub. Date: Nov. 10, 2022

(65) Prior Publication Data
US 2024/0242761 A1   Jul. 18, 2024

(30) Foreign Application Priority Data

May 5, 2021 (EP) ..................................... 21172323

(51) Int. Cl.
*G11C 7/10* (2006.01)
*G11C 11/412* (2006.01)
*G11C 11/418* (2006.01)
*G11C 11/419* (2006.01)

(52) U.S. Cl.
CPC .......... *G11C 11/418* (2013.01); *G11C 11/412* (2013.01); *G11C 11/419* (2013.01)

(58) Field of Classification Search
CPC ... G11C 11/418; G11C 11/412; G11C 11/419; G11C 7/1018; G11C 7/12; G11C 8/08; G11C 11/413
See application file for complete search history.

(56) References Cited

U.S. PATENT DOCUMENTS

| | | | |
|---|---|---|---|
| 5,617,555 A | * | 4/1997 | Patel ........................ G11C 8/12 711/100 |
| 5,784,705 A | | 7/1998 | Leung |
| 5,923,615 A | | 7/1999 | Leach et al. |
| 6,181,612 B1 | | 1/2001 | Wada |

(Continued)

*Primary Examiner* — Khamdan N. Alrobaie
(74) *Attorney, Agent, or Firm* — Dinsmore & Shohl LLP

(57) ABSTRACT

A burst access memory comprises a memory array comprising a plurality of memory macros comprising an array of memory cells in rows and columns. The memory cells in each column are connected by at least one local bit line. The array of memory cells and local bit lines define the memory macro. A plurality of global bit lines are each connectable to several corresponding local bit lines. A controller schedules a burst access of the burst access memory by generating a plurality of macro accesses to the memory macros. The plurality of macro accesses are scheduled to start with a predefined delay in relation to each other. Each macro access is divided into a plurality of ordered sub-operations. Consecutive macro accesses are directed to different memory macros and different columns. Data for consecutive macro accesses are arranged in the different memory macros and columns to match the consecutive macro accesses.

20 Claims, 12 Drawing Sheets

(56) References Cited

U.S. PATENT DOCUMENTS

| | | |
|---|---|---|
| 7,017,022 B2 | 3/2006 | Jeddeloh |
| 2002/0036944 A1* | 3/2002 | Fujimoto ................. G11C 7/18 |
| | | 365/230.06 |
| 2004/0017691 A1* | 1/2004 | Luk ..................... G11C 11/4097 |
| | | 365/149 |
| 2005/0052922 A1 | 3/2005 | Park et al. |
| 2005/0128837 A1 | 6/2005 | Kim |
| 2006/0133186 A1* | 6/2006 | Hummler ............. G11C 7/1018 |
| | | 365/230.06 |
| 2006/0176753 A1* | 8/2006 | Chan .................... G11C 11/413 |
| | | 365/230.03 |
| 2012/0243304 A1* | 9/2012 | Hoya .................. G11C 11/1657 |
| | | 365/158 |
| 2014/0032812 A1 | 1/2014 | On |
| 2017/0358334 A1* | 12/2017 | Onuki .................. G11C 7/1018 |

\* cited by examiner

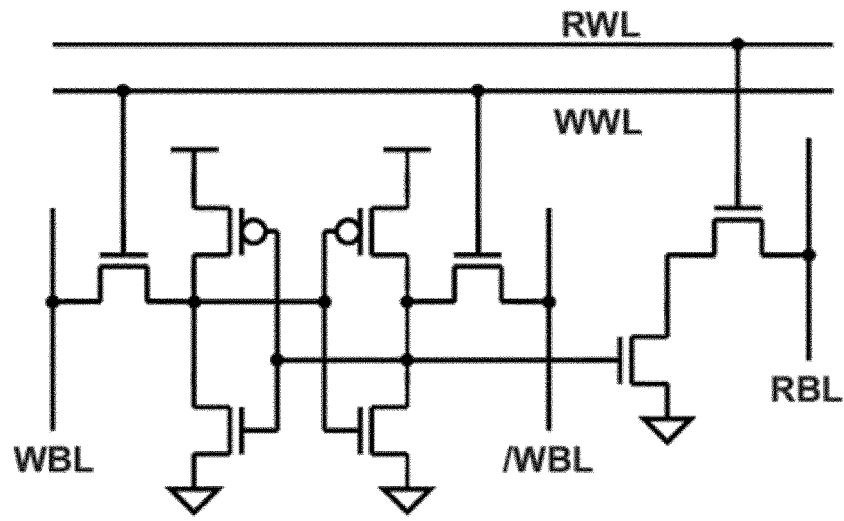
FIG. 4C
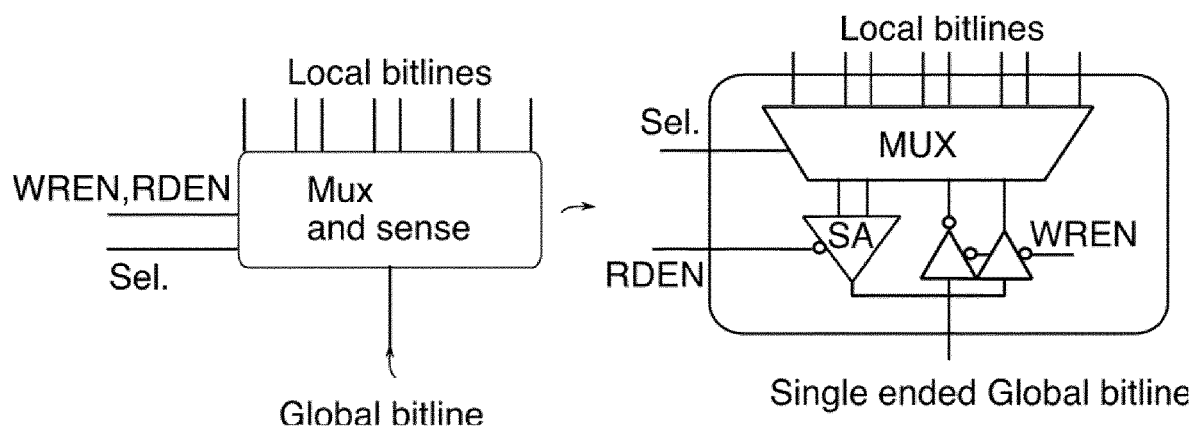
FIG. 5A
FIG. 5B

BURST ACCESS MEMORY AND METHOD OF OPERATING A BURST ACCESS MEMORY

CROSS-REFERENCE TO RELATED APPLICATIONS

This application is the U.S. National Stage of PCT/EP2022/062099 filed on May 5, 2022, which claims priority to European Patent Application 21172323.4 filed on May 5, 2021, the entire content of both are incorporated herein by reference in their entirety.

FIELD OF THE INVENTION

The present disclosure relates to a burst access memory having internal mechanisms and structures for improving access speed and/or power consumption.

BACKGROUND OF THE INVENTION

Memories, for example Static Random Access Memories (SRAM), are widely used in integrated circuits and may account for a significant portion of the critical timing path in a digital design, for example, in a digital ASIC (Application Specific Integrated Circuit). A typical memory cell of an SRAM memory is a six-transistor (6T) memory cell made up of six MOSFETs. Each bit is stored on four transistors that form two cross-coupled inverters. In addition to the four transistors, the two cross-coupled inverters are connected to a bit line and an inverted bit line through two further access transistors, which are controlled by a common word line in the standard single-port 6T SRAM cell. Other types of SRAM cells exist.

Memory cells in SRAMs are typically being accessed using an address which is decoded to feed or access the proper word line and bit lines. The time it takes to access a memory is often a limiting factor in circuit design, which are required to be clocked at increasingly higher frequencies. If the time that it takes for the memory to output a data is greater than the clock period at which the circuit operates, the designer can reduce the clock frequency of the design, which may have a performance impact, or apply other techniques, such as splitting the memory into several smaller instances. One technique to speed up accessing of memories is to use burst accesses. For burst accesses the memory will start reading or writing at a given address and then continue reading or writing data from/to consecutive addresses. This can save some decoding time. However, employing burst accesses may not be enough to meet the design targets with respect to speed (clock frequency) and operating voltage for a given process technology.

It would thus be beneficial to have a burst access memory capable of operating at higher clock frequencies relative to the operating voltage for a given process technology.

SUMMARY OF THE INVENTION

The present disclosure relates to a burst access memory with improved relative read and write speeds. When accessing a memory, external commands in the form of enable signals, addresses and data need to be decoded and propagated to the memory array, at which an access needs to be performed. When data is read, the data needs to pass bit lines, sense amplifiers and output logic. The total signal path for an access is often a bottleneck when operating at very high speed. In burst mode, however, the delay resulting from decoding and bit cell accesses is eliminated. The present disclosure relates to further improvements of burst accesses of a memory. According to a first embodiment a burst access memory comprises:

- a memory array comprising a plurality of memory macros, each memory macro comprising an array of memory cells arranged in rows and columns; wherein the memory cells in each column are connected by at least one local bit line, said array of memory cells and the local bit lines defining the memory macro;
- a plurality of global bit lines and bit line switches, wherein each global bit line is connectable to several corresponding local bit lines of the memory macros
- a controller configured to schedule a burst access of the burst access memory by generating a plurality of macro accesses to the memory macros, wherein the plurality of macro accesses are scheduled to start with a predefined delay in relation to each other, wherein each macro access is divided into a plurality of ordered sub-operations, and wherein consecutive macro accesses are directed to different memory macros and different columns, wherein data for consecutive macro accesses are arranged in the different memory macros and the different columns to match the consecutive macro accesses. A new macro access may be scheduled to start on every clock cycle of a clock signal, and, preferably, the plurality of ordered sub-operations are executed in series, wherein each sub-operation starts on every cycle of the clock signal. The 'clock cycle' in this context may be seen as a reference clock or system clock. As would be understood by a person skilled in the art, if there are other clock signals running on different frequencies, each sub-operation does not necessarily have to start on every cycle. As an example, if the system clock runs at 5 GHz and a second faster clock runs at 10 GHz, the sub-operations can start at every second clock cycle of the 10 GHz clock. It is also possible that different sub-operation use a different number of clock cycles to be executed. For such embodiments, the burst access memory may be configured to take into account such differences. Consequently, the flow of sub-operations that start do not have to be completely evenly distributed. It is possible that, for example, a sub-operation related to a decoding task takes, for example, one clock cycle, whereas a bit line related sub-operation takes several clock cycles.

The macro accesses to the memory macros may be read or write accesses. A burst in the context of the present disclosure may be read accesses only, write accesses only, or a mix of read and write accesses. As an example, the accesses may be composed of alternating read and write accesses (read-write-read-write and so forth). As a second example, the accessed may be composed of a number of read accesses followed by a number of write accesses (read-read-read-read-write-write-write-write and so forth). The memory supporting both read and write accesses shall be seen as a general option throughout the disclosure. The burst access memory may further comprise an input and/or output multiplexer that is shared between the memory macros. The plurality of global bit lines may either be connected directly to the output multiplexer, as shown in FIG. 1A, or connected to read or write circuitry, such as sense amplifiers, that are connected to the multiplexer, as shown in FIG. 1B. Similarly, if write operations are performed, an input multiplexer or any suitable logic may be used to direct the data to be written to right column, optionally through a buffer 113, as shown in FIG. 1C. A memory macro may be seen as a subset of the memory cells of a memory. A memory macro thus comprises an array of memory cells arranged in rows and columns. A memory macro may further comprise local bit lines for the columns, wherein the memory cells in each column are connected by at least one local bit line. Within the context of the present invention, a memory macro does not include local read/write buffers, sense amplifiers and buffers. The local bit lines of one column of several memory macros may be connected to a global bit line shared by the memory macros. By using this structure and the schedule in which each macro access is divided into a plurality of ordered sub-operations, and wherein consecutive macro accesses are directed to different memory macros and different columns, wherein data for consecutive macro accesses are arranged in the different memory macros and the different columns to match the consecutive macro accesses, a solution is achieved in which the multiplexing and read-out can be done centrally, as shown in, for example, FIG. 1A, in which the sense amplifiers 112 are arranged after the multiplexer 111 with respect to the memory array 107, given a read operation example. It can be noted that 'memory macros', as defined in the present disclosure, are arrays of memory cells without read/write logic. The memory macros may be referred to as 'plain memory macros'. The memory macros of the presently disclosed burst access memory may thus share the same decoding unit, sense amplifier and/or any other read/write logic.

The embodiment can be said to break down the critical path of accesses of the memory. The clock signal, which may be clock signal used for logic related to inputs and/or outputs (I/O) and/or further peripheral logic in the memory, may be a clock signal of very high frequency, such as at least 1 GHz, or at least 2 GHz, or at least 5 GHZ, or at least 10 GHz. The access of the memory cells themselves may not be possible within one such clock cycle. Therefore, the controller may be configured to generate a plurality of macro accesses to the memory macros, wherein the duration of each macro access is several clock cycles. The macro access may thus be referred to as multi-cycle macro accesses with respect to the fast clock signal for the I/O logic. The inventor has realized that a multi-cycle macro accesses can be divided into a plurality of ordered sub-operations that are executed sequentially. By starting one macro access with a predefined delay with respect to the previous macro access—this can be done for example by starting a new macro access on every clock cycle of the fast clock—a parallel utilization of the functions related to the memory array is made possible. The operating principle and the benefits are similar to those of pipeline processing. While pipelining has been applied to memory accesses in conventional solutions, this has been, for example, by splitting the critical path to an address decoding stage, an access stage, and an output stage. However, this does not solve the issues of the memory access themselves possibly being the bottle necks. In the presently disclosed burst access memory, the critical paths of the memory accesses are broken as well. This is done by using a plurality of memory macros and dividing each macro access into a plurality of ordered sub-operations related to the operation of the memory cells, e.g. the steps of applying voltage levels to word lines and bit lines, bit line precharging, activation of sense amplifiers etc. One challenge with such parallelism at the memory array is that some of the hardware being used is active may be used by several consecutive sub-operations. The inventor has realized that certain organization of data in the memory array in combination with certain access order may solve such problems. According to a first embodiment, the memory array is divided into a plurality of memory macros, each memory macro comprising an array of memory cells arranged in rows and columns. Consecutive multi-cycle macro accesses are directed to different memory macros and different columns, wherein data of the consecutive memory accesses are arranged in the different memory macros and the different columns to match the consecutive accesses.

An example is provided in FIG. 2. As can be seen, a first macro access 102 of a first bit cell 1a is made on a first rising edge 105 on the clock 106. The first bit cell 101 is located in a first macro 104 and in the first column 103, which is associated with a pair of bit lines. The second bit cell 2a in the burst, which would normally be placed next to 1a, is placed in the second column 103 in the second memory macro. The second macro access 102' of the second bit cell 2a is made on a second rising edge 105' on the clock 106. The access can be either read or write accesses. The macro accesses may be overlapping in time for both read and write accesses.

The disclosure further relates to a method of operating a burst access memory comprising a plurality of memory macros, each memory macro comprising an array of memory cells arranged in rows and columns, the method comprising the steps of:
  generating a plurality of macro accesses to the memory macros, wherein the plurality of macro accesses are scheduled to start with a predefined delay in relation to each other, wherein each macro access is divided into a plurality of ordered sub-operations,
  wherein consecutive macro accesses are directed to different memory macros and different columns, wherein data for consecutive memory accesses are arranged in the different memory macros and the different columns to match the consecutive macro accesses. The method may be performed on any embodiment of the presently disclosed burst access memory.

BRIEF DESCRIPTION OF THE DRAWINGS

FIG. 4A-C show embodiments of a bit cells;
FIG. 5 shows embodiments of connections between local and global bit lines.

DETAILED DESCRIPTION OF THE PREFERRED EMBODIMENTS

Figure 1A:
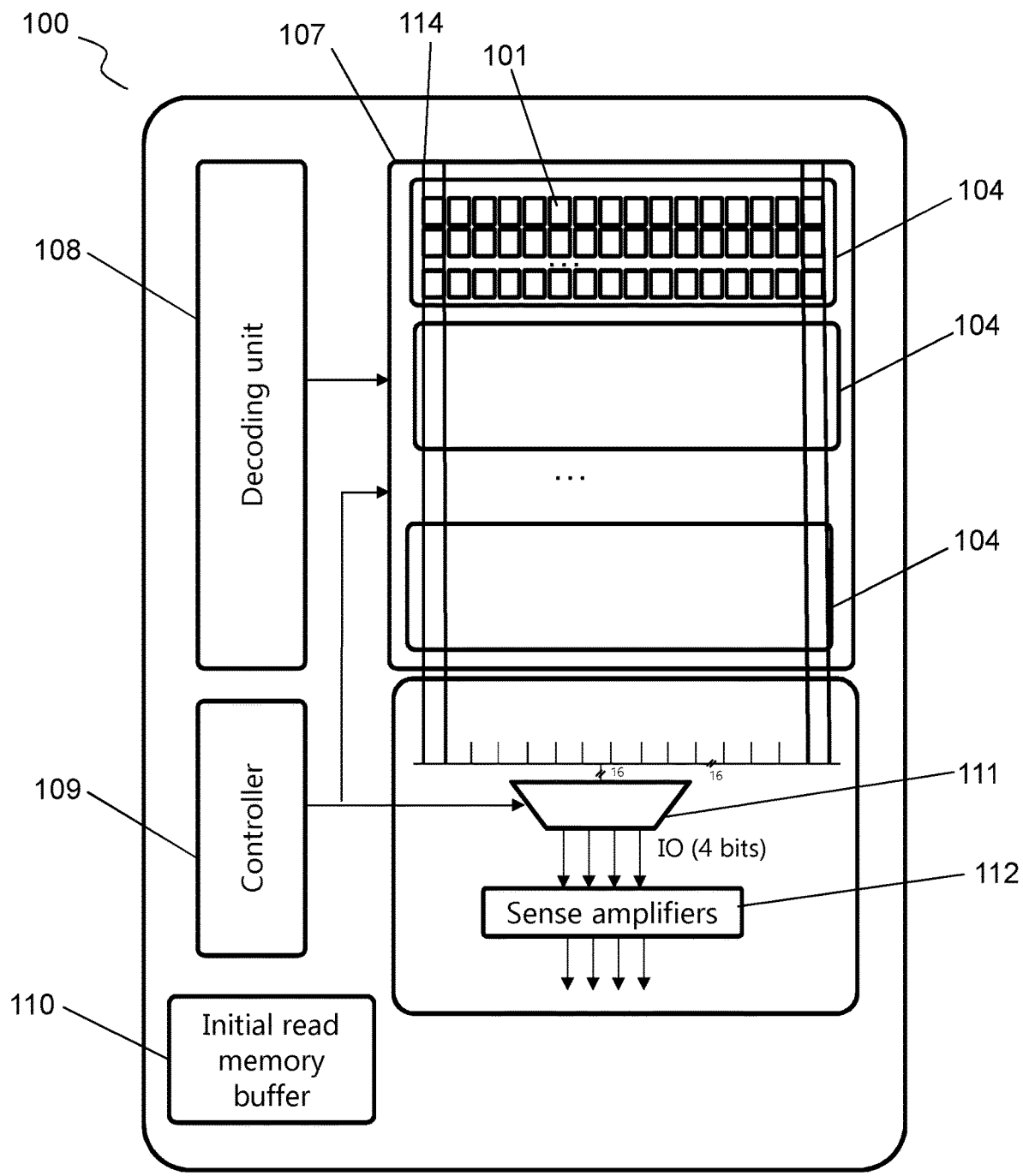
FIG. 1A-F show embodiments of the presently disclosed burst access memory.

The present disclosure relates to a burst access memory with improvements with respect to read and write speeds relative to the voltage at which the memory operates. The term "speed relative to the voltage" shall be construed in light of the well-known fact that switching speeds in digital circuits can be improved by providing higher voltage levels. The presently disclosed burst access memory can increase speeds for a given voltage level. This also means that if a certain read/write speed can be achieved with a given supply voltage for a conventional memory, using the presently disclosed memory technology can enable the same speed but at a lower supply voltage. The burst access memory comprises a memory array comprising a plurality of memory macros, each memory macro comprising an array of memory cells arranged in rows and columns. As would be understood by a person skilled in the art, a memory typically comprises, besides memory arrays, a number of peripheral logic and components, such as decoders (row decoders/row selection logic, column decoders), sense amplifiers, input/output buffers, ports (data, address, enable signals, reset, clock etc.), multiplexers and control circuitry. In a memory that supports burst mode, access do not have to be done in one clock cycle. The memory then starts reading or writing from an address and continues reading or writing from consecutive address. This allows faster data rates. According to one embodiment of the presently disclosed burst access memory, the controller is configured to schedule a burst access of the burst access memory by generating a plurality of macro accesses to the memory macros, wherein the plurality of macro accesses are scheduled to start with a predefined delay in relation to each other. Preferably, each macro access is divided into a plurality of ordered sub-operations. This has the advantage that the ordered sub-operations can be distributed in time, for example, such that a first macro access performs a first sub-operation while a second macro access performs a second sub-operation. The macro access being divided into a plurality of ordered sub-operations, wherein consecutive macro accesses are directed to different memory macros and different columns, shall not be construed as excluding that accesses re-start at columns that have been used but at some point are available again. As an example, the accesses may be circular in the sense that they access columns starting at column 0 and incrementing upwards until the last column is reached and the accesses then re-start at 0. The presently disclosed burst access memory can be said to break down the critical path of accesses of the memory. In order to avoid internal conflicts in the operations on the memory, preferably data is organized such that consecutive macro accesses are directed to different memory macros and different columns. In other words, if accesses start at a given address, consecutive macro accesses with respect to the start address will occur according to a predefined access pattern as described. Data is consequently arranged in the memory array to match the predefined sequence of accesses as described.

Figure 4A:
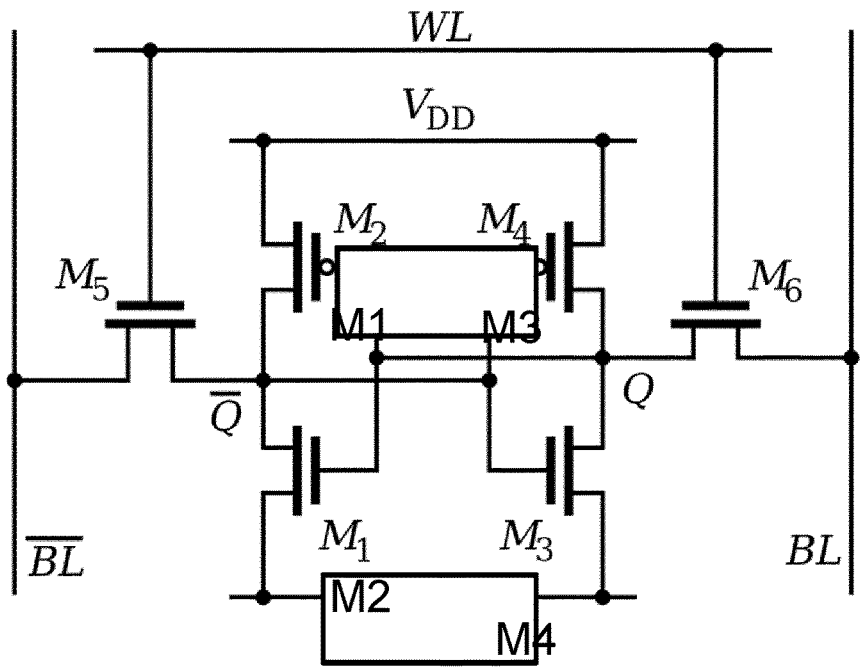
Figure 4B:
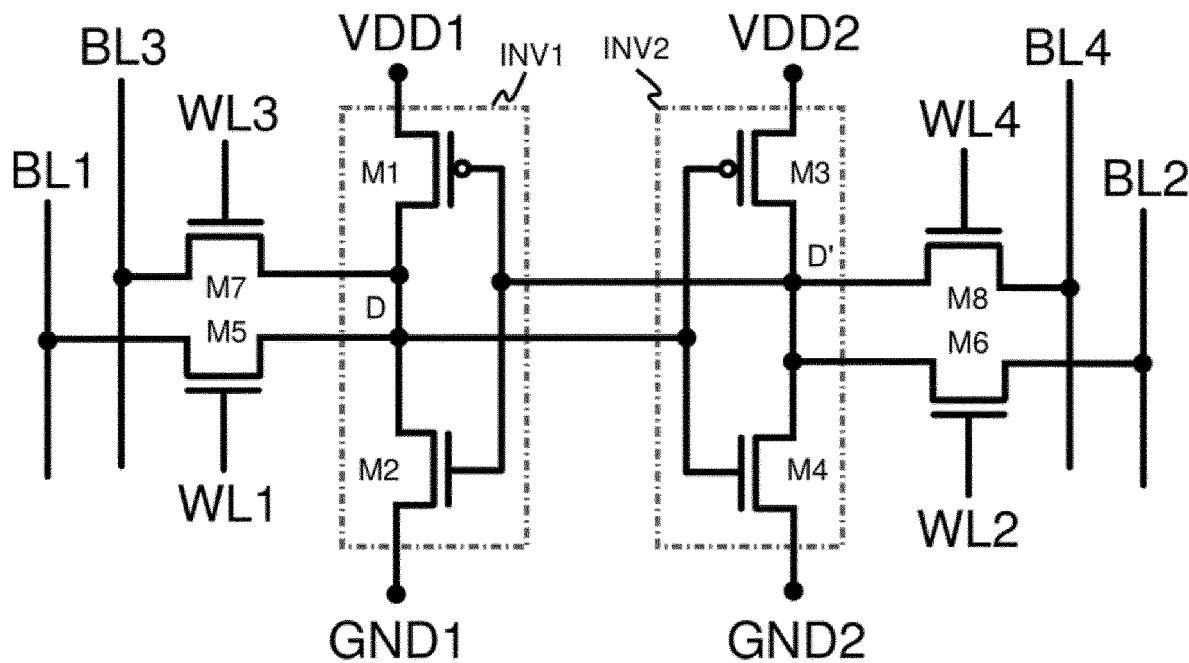

'Consecutive macro accesses' shall be given a broad meaning within the context of the present application, wherein a macro access under some circumstances may include several accesses. The following examples illustrate how such multi-accesses can be considered to follow within the scope of the invention. According to a first normal scenario, the memory cells are single-port memory cells, such as a 6T memory cell, as shown in FIG. 4A. When this type of cell is accessed, the bit lines BL and BL may be used in a well-known fashion. Since the bit lines are occupied, in this embodiment the consecutive macro access, i.e. the macro access following the first macro access is directed to a different memory macro and a different column. However, it is also possible to use other types of bit cells and still make use of the presently disclosed technology. One example is a dual-port memory cell, such as an 8T dual-port memory cell as shown in the example of FIG. 4B. It shall be noted that such a cell has two pairs of bit lines, BL1/BL2 and BL3/BL4. In such a cell there can be two access in parallel or two consecutive accesses for which the two pairs of bit lines will not block each other. In this scenario it is considered that the 'consecutive macro accesses' that are referred to each may comprise several macro accesses as long as they use different bit lines. FIG. 4C provides a further example of a memory cell for which two sub-accesses that may form what is referred to as a macro access. The memory cell may have even further ports and a macro access may accordingly comprise further sub-accesses.

Figure 3A:
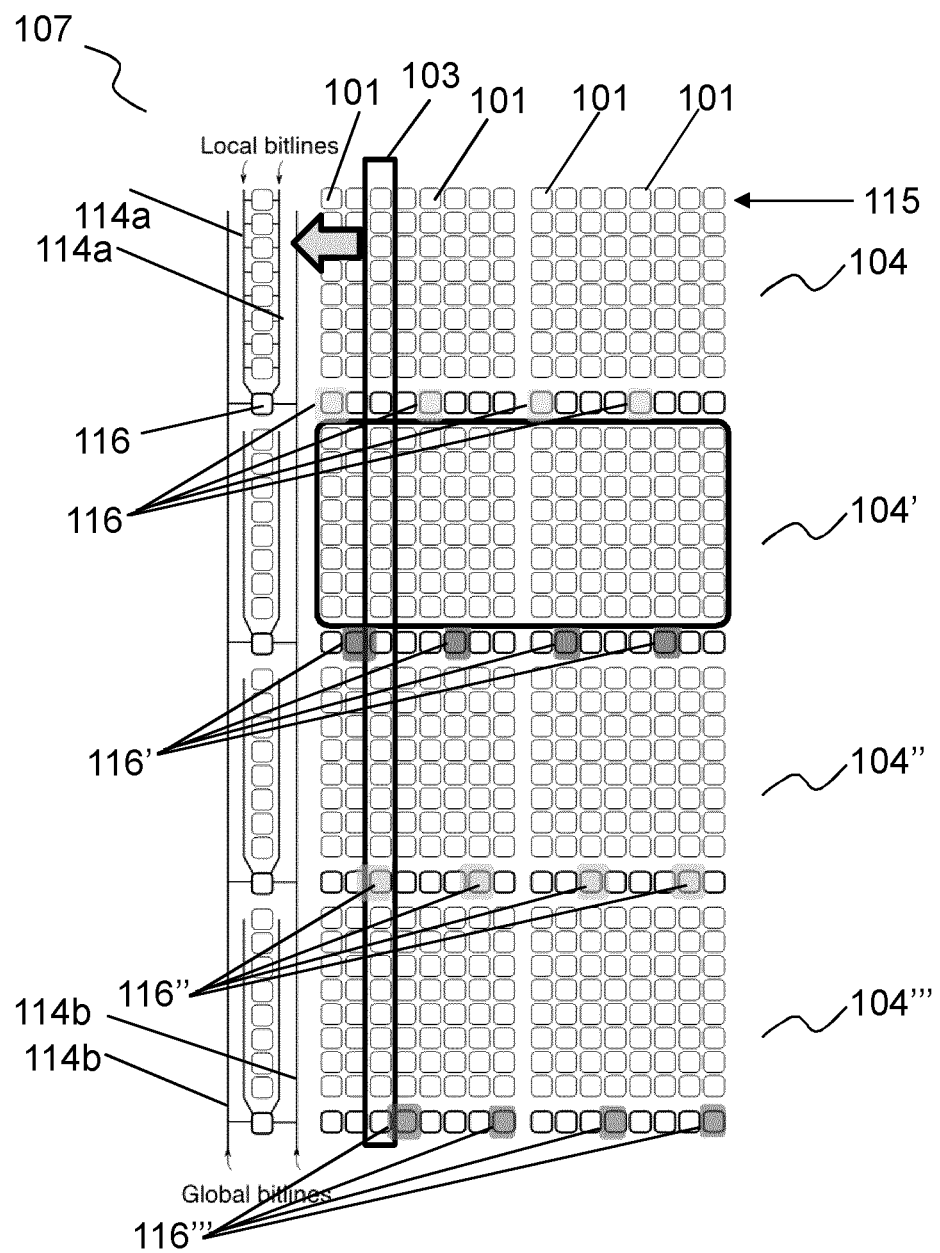
FIG. 3A-B show examples of operation of the burst access memory.

One example of operation of the burst access memory and access pattern is illustrated in FIG. 3A. The memory array 107 has four memory macros 104, 104', 104" and 104''', each memory macro 104 comprising columns 103 and rows 115 of bit cells 101. Every memory macro has 16×8 bit cells 101. The columns within the memory macros have local bit lines 114a, or more typically pairs of local bit lines 114a. The local bit lines 114a of a column 103 is connectable through a bit line switch 116 to a global bit line 114b for the same column 103 of all memory macros 104. The switches can thus control which memory macros 104 that have access to the global bit line 114b for each column 103. In the example a first macro access comprises parallel access of 4 bit cells in the first memory macro 104 that can be accessed without conflict. This is illustrated by the enabling of 4 bit line switches 116 for the first memory macro 104. Bit cells form columns number 0, 4, 8 and 12 from the left are accessed. A second macro access comprises parallel access of 4 bit cells in the second memory macro 104' that can be accessed without conflict. The second macro access preferably occurs slightly delayed in relation to the first macro access. This is illustrated by the enabling of 4 bit line switches 116' for the second memory macro 104'. Bit cells form columns number 1, 5, 9 and 13 from the left are accessed. A third macro access comprises parallel access of 4 bit cells in the third memory macro 104" that can be accessed without conflict. The third macro access preferably occurs slightly delayed in relation to the second macro access. This is illustrated by the enabling of 4 bit line switches 116" for the third memory macro 104". Bit cells form columns number 2, 6, 10 and 14 from the left are accessed. A fourth macro access comprises parallel access of 4 bit cells in the fourth memory macro 104" that can be accessed without conflict. The fourth macro access preferably occurs slightly delayed in relation to the third macro access. This is illustrated by the enabling of 4 bit line switches 116''' for the fourth memory macro 104". Bit cells form columns number 3, 7, 11 and 15 from the left are accessed.

Figure 3B:
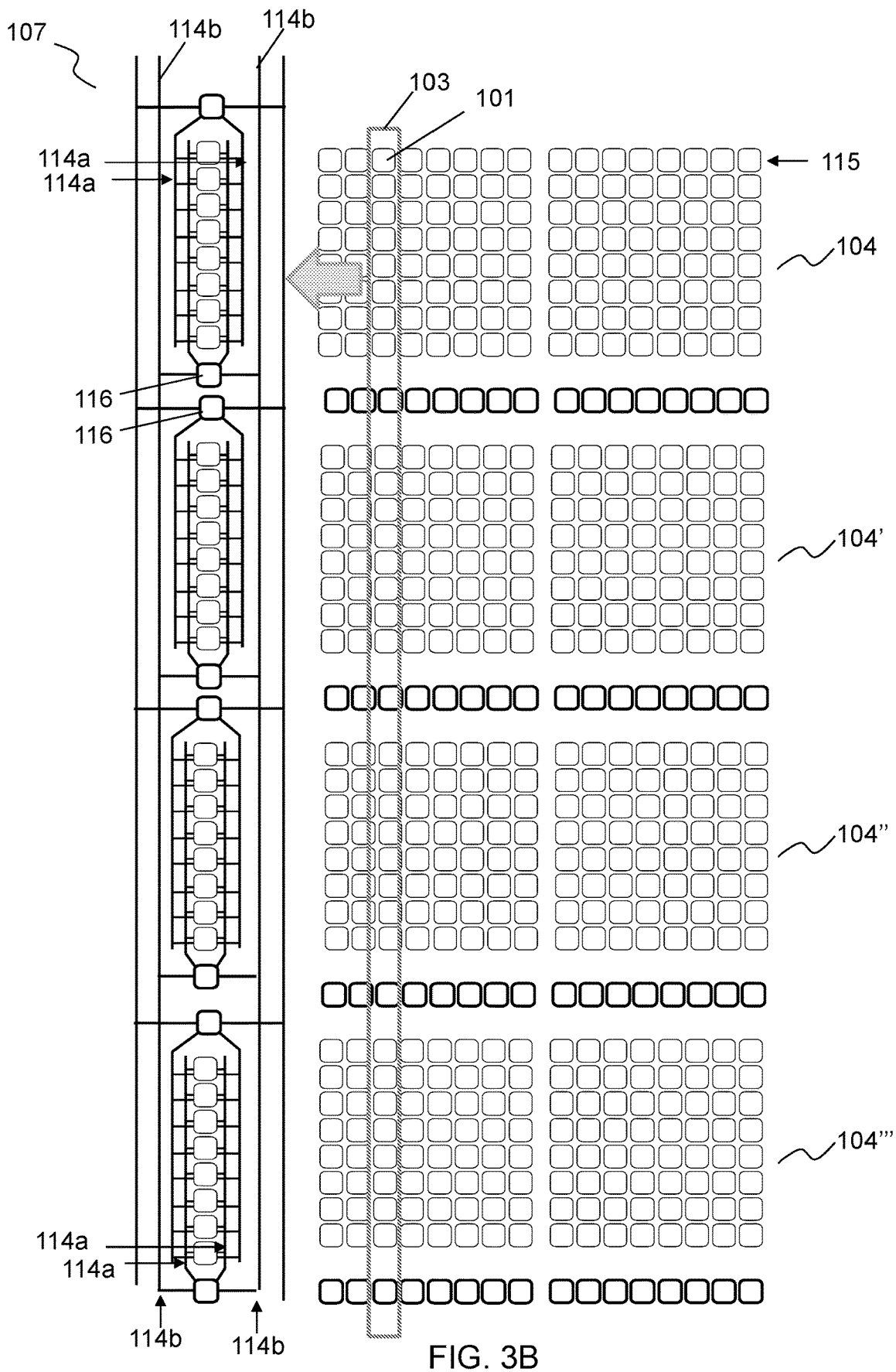

The memory array in FIG. 3B shows a further example of a memory array 107 comprising a plurality of memory macros 104, 104', 104" and 104''', each memory macro 104 comprising columns 103 and rows 115 of bit cells 101. In this example each cell, and according each column, has two pairs of bit lines. The columns 103 within the memory macros 104 have two pairs of local bit lines 114a. These pairs of bit lines may correspond to a bit cell of the type shown in FIG. 4B. The local bit lines 114a of a column 103 are connectable through bit line switches 116 to global bit lines 114b.

Since the macro accesses are divided into a plurality of sub-operations and the macro accesses are delayed in relation to each other, parallel utilization of the functions related to the memory array is made possible. The operating principle and the benefits are similar to those of pipeline processing, which is made possible by the arrangement of data in the memory macros. The arrangement is particularly useful if the access latency of the burst access memory is significantly longer than a clock cycle, such as at least two clock cycles, or at least four clock cycles, or at least eight clock cycles, or at least 16 clock cycles.

Figures 2A, 2B:
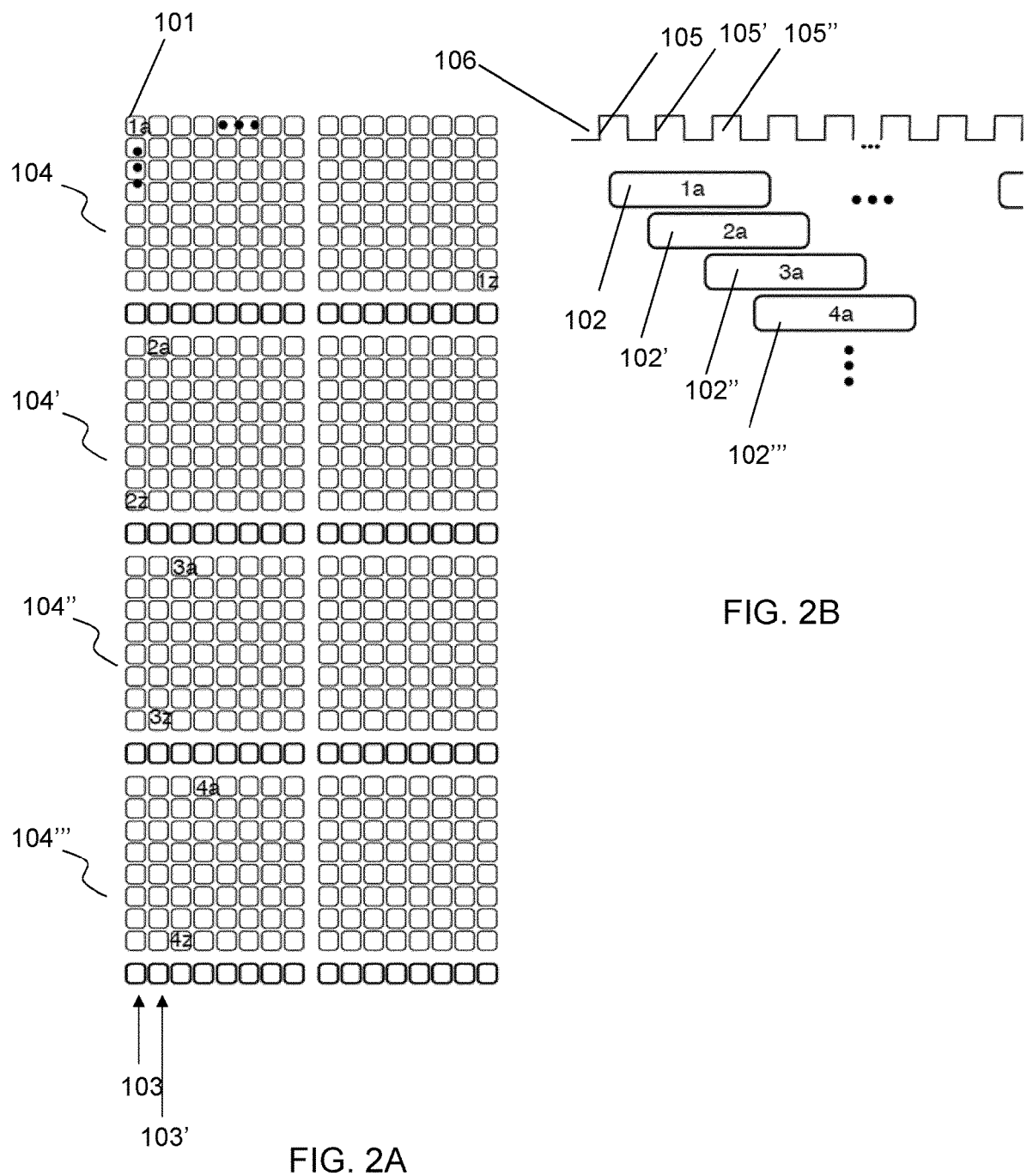
FIG. 2 shows an example of operation of the presently disclosed burst access memory.

One way of delaying the macro access is to use a fast clock and to generate a new macro access on every clock cycle. The term "fast" in this context can be seen as a clock running at a frequency at which it is not possible for the memory array to deliver data within one clock cycle for a given nominal operation voltage. The clock may, for example have a frequency of at least 1 GHz, preferably at least 2 GHz, more preferably at least 5 GHz, even more preferably 10 GHz. If the access latency for the memory array is greater than 1 ns, 500 ps, 200 ps or 100 ps, respectively, a conventional burst memory would not be able to deliver data every clock cycle. According to one embodiment, the operating frequency, i.e. the frequency of the fast clock, is at least 1 GHz wherein the access latency of a memory macro is at least 3 ns, preferably at least 2 GHz wherein the access latency of a memory macro is at least 1.5 ns, more preferably at least 5 GHz wherein the access latency of a memory macro is at least 600 ps, even more preferably 10 GHz wherein the access latency of a memory macro is at least 300 ps. When data cannot be delivered every clock cycle the macro accesses of the presently disclosed burst access memory can be referred to as multi-cycle macro accesses. The macro accesses 102, 102', 102" and 102" in FIG. 2 illustrate overlapping delayed multi-cycle addresses. Therefore, in one embodiment of the presently disclosed burst access memory, the plurality of macro accesses are overlapping in time. Preferably, the data for consecutive memory addresses is arranged in the different memory macros and the different columns such that no collision of memory macros and bit lines occur for overlapping macro accesses. More specifically this means that the first data may be arranged, for example, in a first memory macro and a first column, the second data may be arranged in a second memory macro and a second column, and the third data may be arranged in a third memory macro and a third column, and so forth. Consequently, more generalized, the N:th data may be arranged, for example, in an N:th memory macro and an N:th column. As would be understood by a person skilled in the art, any suitable arrangement of data and access order is possible, as long as no collisions occur. The example of N:th data arranged in an N:th memory macro and an N:th column can be implemented in other similar arrangements. As an example, if bit line 0 (column) is used for data 0 arranged in memory macro 0, at some predetermined point in time, bit line 0 will be available for further accesses in different macros, such as macro N+1. Data and data accesses can then be arranged such that bit lines that are available according the used access scheme can be reused as soon as they are available. For example, the first data can be placed in any suitable memory macro. An access may not necessarily be access of a single cell. More typically, parallel access of a plurality of interleaved cells constituting, for example, bytes or words, may be considered an access within the scope of the present disclosure. In the example of FIG. 3A, four bits 101 are read from the first memory macro 104 at the same time. In one embodiment, an access latency of the burst access memory is significantly longer than a clock cycle, such as at least three clock cycles, or at least four clock cycles, or at least five clock cycles, or at least eight clock cycles.

In the example of FIG. 3A, the burst access memory is configured to deliver 4 bits at every clock cycle with some latency due to the multi-cycle nature of the accesses. The controller 109 is configured to control the output multiplexer 111 by time-multiplexing. Hence, in one embodiment the presently disclosed burst access memory comprises an input and/or output multiplexer synchronized with the plurality macro accesses such that data read from the consecutive macro accesses are routed to an output, wherein output data of the consecutive macro accesses are delivered to output ports on every clock cycle of the clock signal, or such that input data delivered ports on every clock cycle of the clock signal from input ports are written to the memory cells in the consecutive macro accesses. A further advantage of the combination of time-multiplexing and the arrangement of data and macro accesses as described in the present disclosure is that the number of sense amplifiers 112 can be limited, in the example of FIG. 3A limited to 4 sense amplifiers since 4 bits are delivered every clock cycle. In this embodiment the sense amplifiers may be arranged after the output multiplexer relative to the memory array. Therefore, in one embodiment the presently disclosed burst access memory is configured to operate without a registered output read buffer. Therefore, in one embodiment the presently disclosed burst access memory input and/or output logic has a data width equal to an internal macro data width of data being accessed in each macro access.

One embodiment of the presently disclosed burst access memory further comprises at least two parallel input and/or output multiplexers, wherein data read from the consecutive macro accesses are alternatingly routed to the two parallel output multiplexers, or wherein data written in the consecutive macro accesses are alternatingly routed to, for example, two pairs of bit lines of a column. As described above, the total signal path for an access is often a bottleneck when operating at very high speed. In the presently disclosed burst access memory, the critical path of memory access are broken down significantly and may typically include only the controller in input or output multiplexing. As an non-limiting example, this may enable running memory accesses at 8 GHz. However, in such a case, instead of running at 8 GHz, a further option may be using two parallel input or output multiplexers, double the number of output ports and run at 4 GHz. This concept may be further expanded to include even further parallel input or output multiplexers and input or output ports and/or additional read logic for certain scenarios. Moreover, in one embodiment, data read from the consecutive macro accesses are alternatingly routed to one output multiplexer and/or write data for consecutive macro accesses is alternatingly routed from an input port. In a further embodiment, data read from the consecutive macro accesses are alternatingly routed to a plurality of output ports and/or write data is alternatingly routed from a plurality of input ports.

Figure 1B:
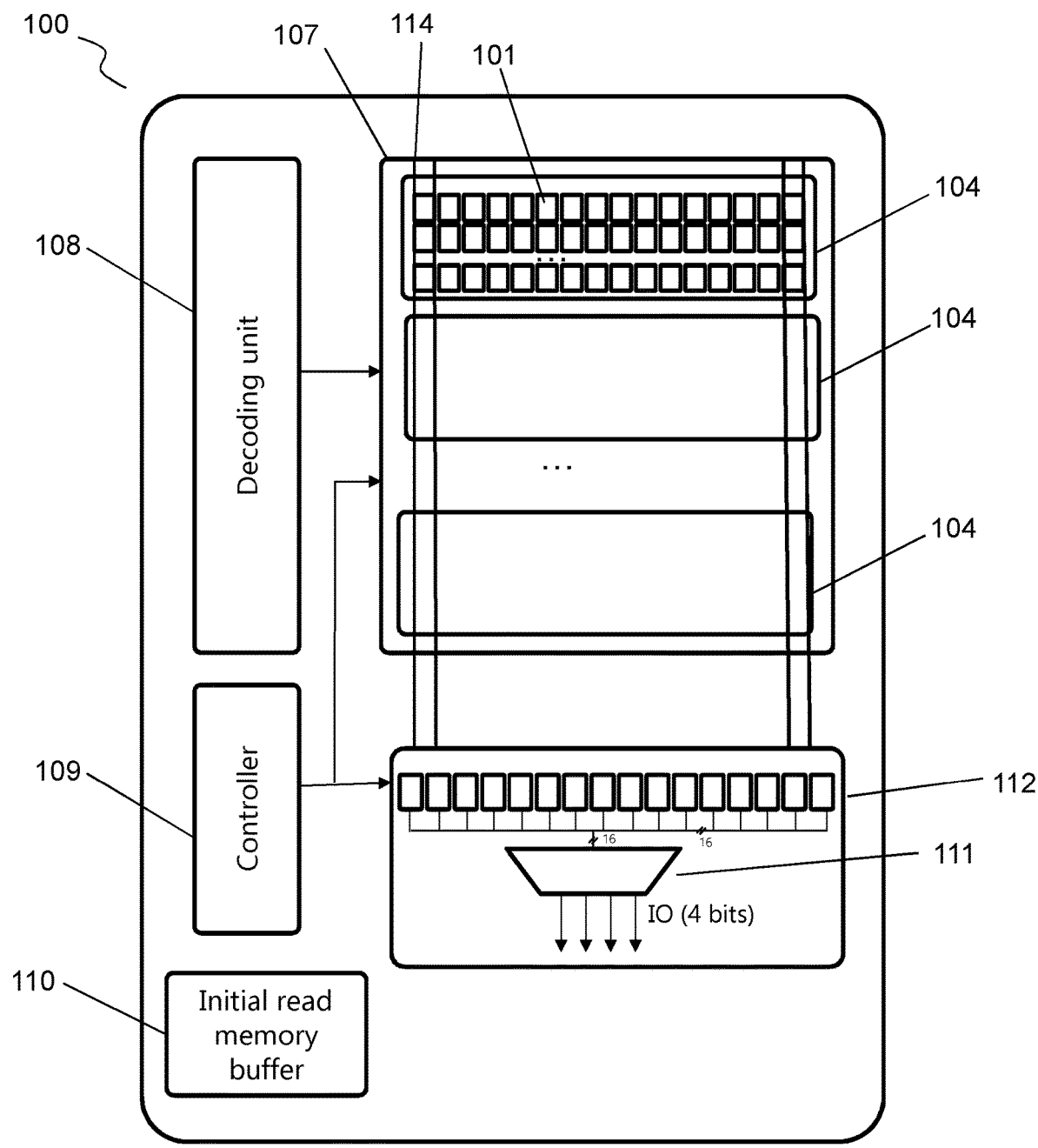
Figure 1C:
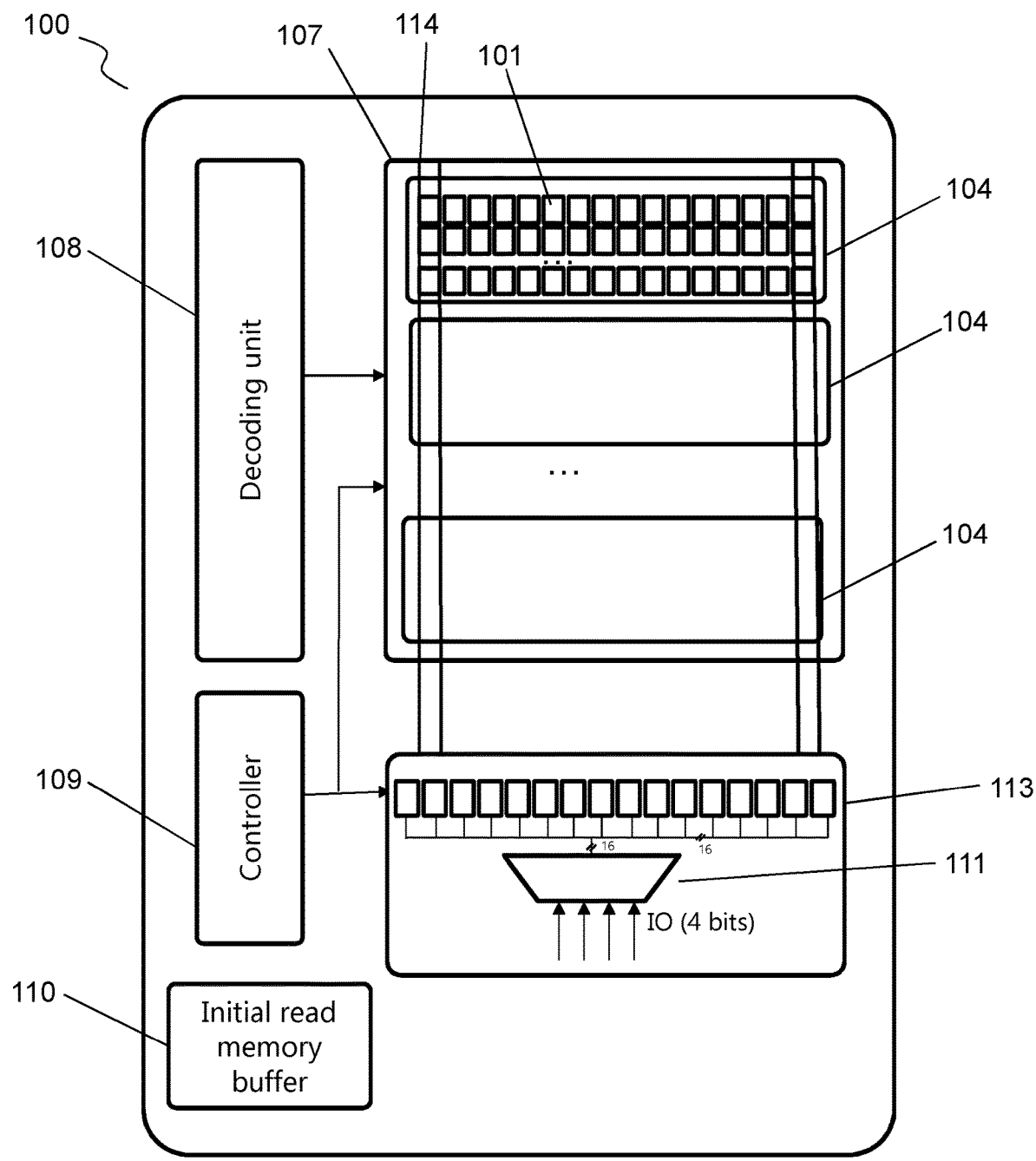
Figure 1D:
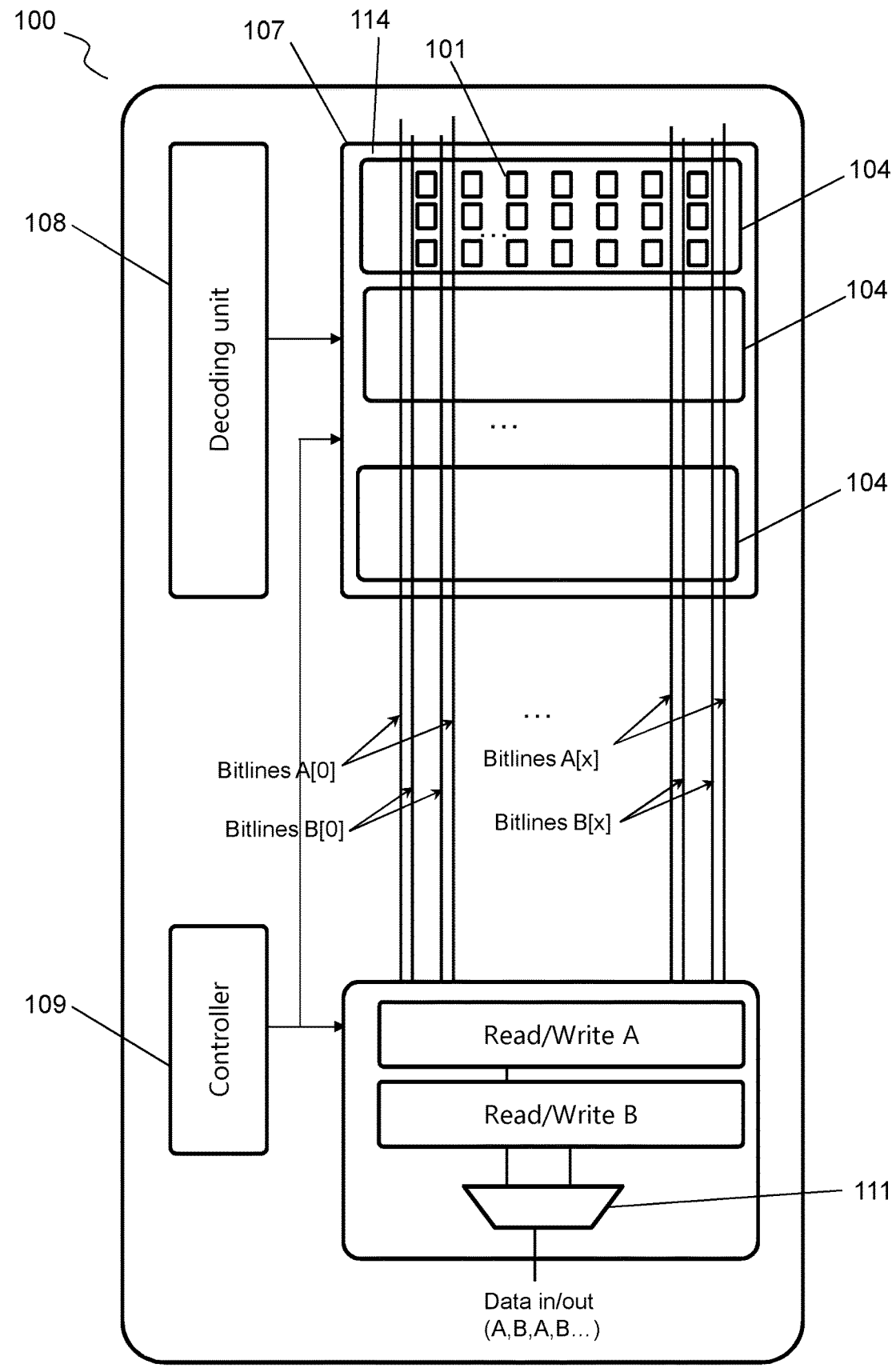
Figure 1E:
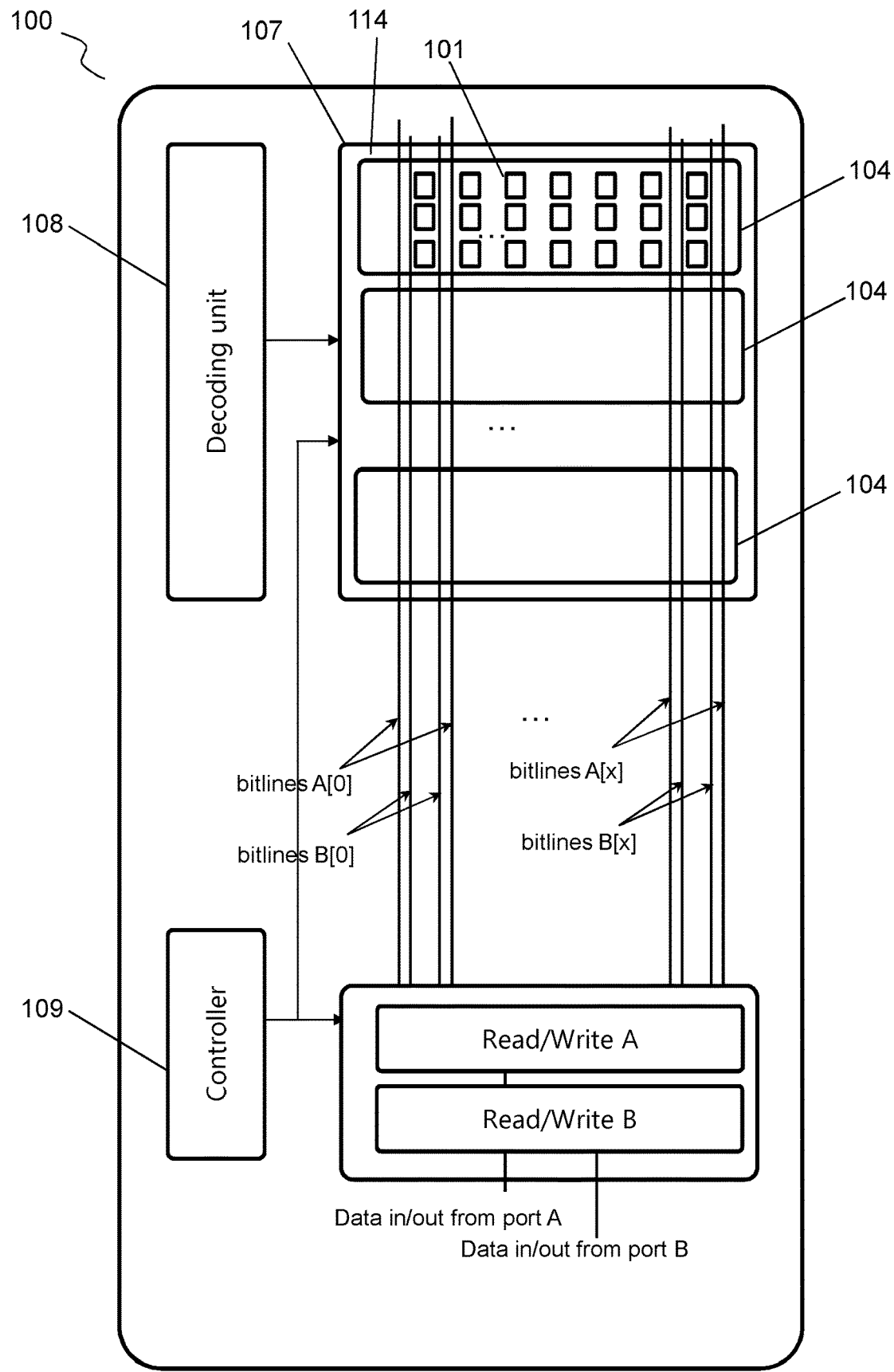
Figure 1F:
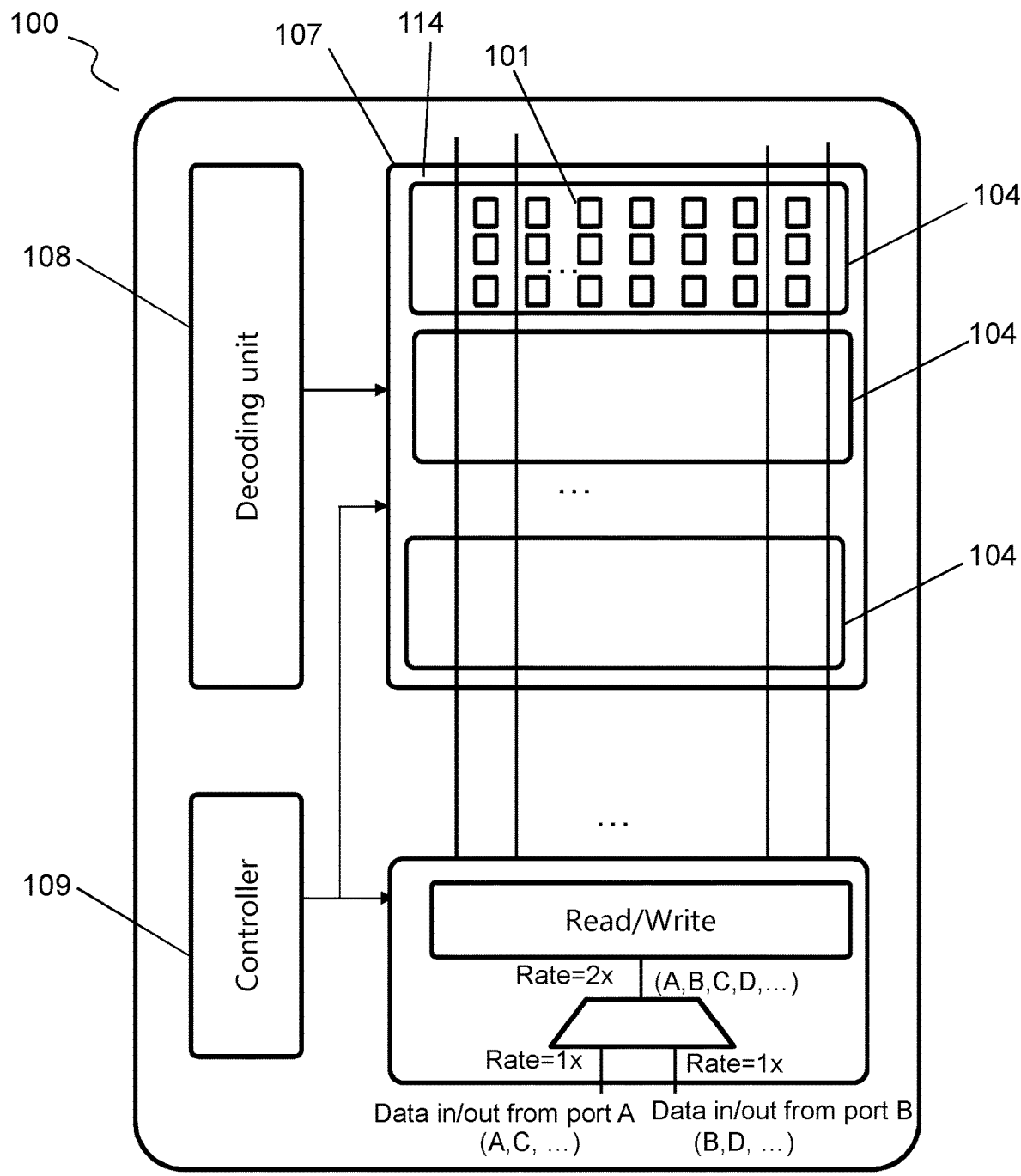

FIG. 1D shows an example, wherein the bit cells are dual port bit cells with two pairs of bit lines A[x] and B[x] for each column. For this implementation data can be read or written alternatingly, exemplified by the sequence data A, data B, data A, data B and so forth. FIG. 1E shows a further example, wherein the bit cells are dual port bit cells with two pairs of bit lines A[x] and B[x] for each column. In this example the read logic comprises structures for reading or writing data A and B in parallel. FIG. 1E shows an example, wherein the bit cells are single port bit cells. In this embodiment the single port bit cell memory structure can be turned into a dual port memory by adding read and/or write logic that splits the accesses to several ports on the memory. In one example data A, C etc. from port A is interleaved with data B, D etc. to create the sequence data A, B, C, D etc. For all of the embodiments of FIGS. 1D-F, dual port bit cells and dual memory ports can be generalized to multi-ports.

The memory cells in each column may be connected by at least one local bit line, wherein the local bit line for each column of the plurality of memory macros are connected to a global bit line, further comprising bit line control logic for selectively connecting the local bit lines of different memory macros to the global bit line. More typically, the columns within a memory macro will have a pair of local bit lines for each column. Corresponding local bit lines of several memory macros may be connectable to a global bit line. The local bit lines can be connected to the global bit lines by means of, for example, switches. If, for example, data is read from a bit cell in the third column of the second memory macro, the local bit line or bit line pair of the third column of the second memory macro is connected to the global bit line or bit line pairs for the third column of all memory macros. According to one embodiment of the presently disclosed burst access memory the memory cells in each column are connected by at least one local bit line, wherein the memory cells in each row are connected by a word line, and wherein the local bit line for each column of the plurality of memory macros are connected to a global bit line connected to corresponding local bit lines of other memory macros. Similarly, the memory cells in each column may be connected by a pair of local bit lines, wherein the pair of local bit lines for each column of the plurality of memory macros are connectable to a pair of global bit lines connectable to corresponding pairs of local bit lines of other memory macros. The memory macros may thus share global bit lines. The burst access memory may comprise bit line switches for controlling connections between the local bit lines and the global bit lines. Moreover, the burst access memory may comprise local multiplexing or control logic for selecting local bit lines to different global bit lines. Global bit lines may also, alternatively, or, in combination, be connected to multiple local bit lines. In this configuration the number of global bit lines may be lower than the number of columns since the parallelism that is proposed in the present disclosure may only use some of the bit lines at a time. FIG. 5A shows an embodiments of connections between local and global bit lines. It can be noted that sense amplifiers can be placed either at the local bit lines or at the global bit lines. FIG. 5B shows an embodiment of connections between local bit lines and a single ended global bit line comprising a multiplexer, sense amplifiers controlled by a read enable signal, and tri-state buffers controlled by a write enable signal. In one embodiment, at least one of the global bit lines is connectable to multiple local bit lines in the same macro. Such a connection may be obtained by using switches activated by control signals from the controller. The switches may be activated when accessing a corresponding macro. The switches may be bidirectional, meaning that during write operation, they transfer data from the global bit line to a selected local bit line, and during read, they transfer data from a local bit line to the global bit line.

The present disclosure further relates to the use of different voltage domains in the burst access memory. The inventor has realized that the presently disclosed burst access memory, which makes use of parallelism to break down the critical path of accesses of the memory by dividing memory macro access into sequentially executed sub-operations and a special arrangement of data in the memory macros, opens possibilities to achieve a number of advantages by using different voltage domain configurations. In one embodiment, the burst access memory is configured to operate with different internal voltage domains, wherein the memory array is supplied with a voltage lower than the rest of the logic of the burst access memory, or wherein the memory array is supplied with a voltage greater than the rest of the logic of the burst access memory. The case in which the memory array is supplied with a voltage lower than the rest of the logic of the burst access memory is made possible by the improvements in speed of the presently disclosed burst access memory. The memory array, which typically accounts for a substantial part of the power consumption can be significantly reduced if it can operate at a lower voltage. The peripheral logic may still need to operate at a higher voltage, but the impact may still be relatively low compared to the memory array. If the goal is to achieve an extremely fast memory, it may be possible to work with a partition in which the memory array is supplied with a voltage greater than the rest of the logic of the burst access memory to reduce stability issues in the memory array. In this case the rest of the logic can still operate at a lower voltage, which also saves power. In a third embodiment, the plurality of memory macros, row selection logic and column logic operate at different voltage levels depending on whether a write operation or a read operation is performed. This can increase the noise margin during read and write operation.

Figure 6:
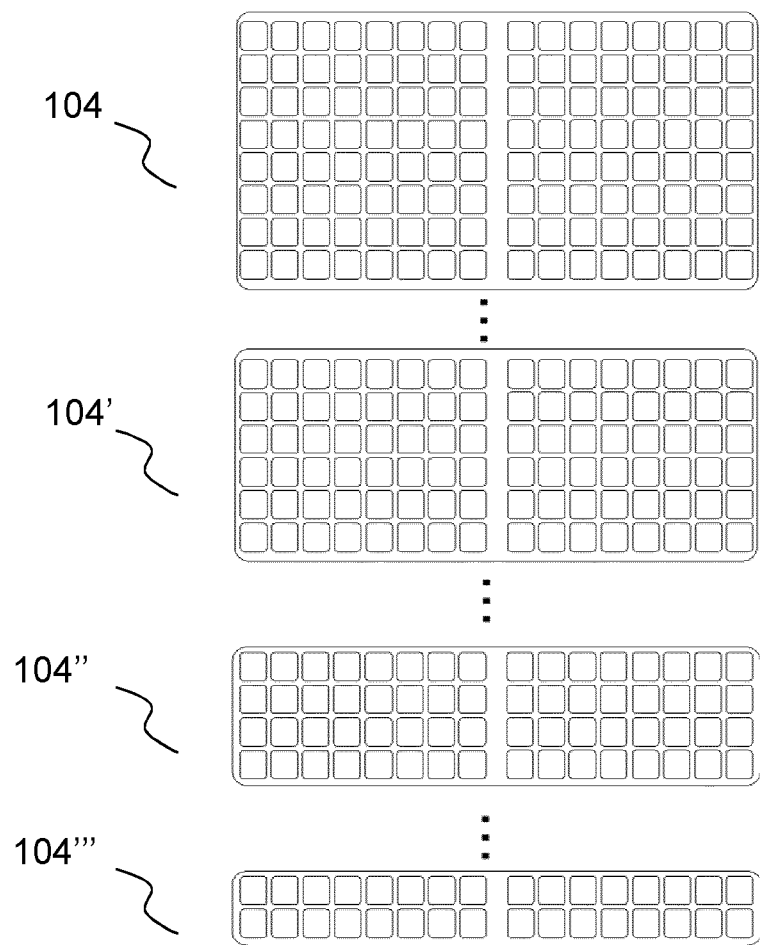
FIG. 6 shows an embodiment of a plurality of memory macros, wherein the memory macros have different sizes.

The present disclosure further relates to an initial burst memory buffer. While the presently disclosed burst access provides increased read and write speeds, there is typically still latency for a first read or write access, i.e. when read data is requested it will typically take a number of clock cycles until the first data is available on the output port. Similarly, it will take a few clock cycles until the first data is written in the memory array. In one embodiment the presently disclosed burst access memory further comprises a separate initial burst memory buffer, wherein the controller is configured to read data from the separate initial burst memory buffer at every clock cycle during a latency period corresponding to the time it takes for the memory array to deliver read data, or wherein the controller is configured to write data to the separate initial burst memory buffer at every clock cycle during a latency period corresponding to the time it takes to write first data to the memory array. In order for separate initial burst memory buffer to work, it has to be preloaded with data intended to be read during the first clock cycles in which the first data is not available on the output port. For a burst access memory this may be done in several ways. In this configuration the initial burst memory buffer may be preloaded with memory data content starting from a configurable and predefined location of the memory array. If, for example, it is known that the read will start from the beginning, every time, or that only the whole memory, or a given memory macro, will be read, then the initial burst memory buffer will be preloaded with data located at the beginning of the memory array, or at the beginning of the given memory macro. Special scheduling may be used in scenarios covering the separate initial burst memory buffer. When a memory access is requested, for example a read access, two parallel operation will start at the same time. The first operation is to read preloaded data from the separate initial burst memory buffer for the number of cycles it takes for the memory array to deliver read data. The second operation is to start a macro accesses at an address subsequent to the address corresponding to the content in the separate initial burst memory buffer. Moreover, according to one embodiment of the presently disclosed burst access memory, the memory macros have different sizes. More specifically, the memory macros may have different number of rows. FIG. 6 shows an example of a plurality of memory macros, wherein the memory macros (104, 104', 104", 104''') have different number of rows. Having memory macros with different sizes may be particularly beneficial in combination with the initial burst memory buffer. Different sizes of memory macros will typically imply different latency for read or write accesses. When using an initial burst memory buffer, the buffer can be matched against different latencies and read or write scenarios.

In a further embodiment, which may be useful for implementations of memory macros with different sizes but also for other situations, the controller is configured to generate the plurality of macro accesses to the memory macros in an order based on timing and/or response time of individual memory macro accesses and/or macro access size. This may an advantage if, for example, one macro is slower than the other macros. If the memory macros are numbered, for example, 0, 1, 2 and 3, and accesses of memory macro 3 is slower than the other macro accesses, it is possible to access the memory macros in the order 0-1-2-3-0-1-2-0-1-2-3 etc. In this example, macro access number 3 is skipped every second time since the macro may not ready for accesses every round. Alternatively, macro 2 and 3 could be alternatingly accessed, for example, in the order 0-1-2-0-1-3-0-1-2-0-1-3 etc. In one embodiment a predefined macro access is skipped at least every second time and/or a number of predefined macro accesses are accessed alternatingly in a sequence of macro accesses. In one embodiment a timing unit is configured to arrange accesses in an order such that macro accesses taking longer than a predefined access time are skipped at least every second time.

The plurality of ordered sub-operations may be selected depending on several parameters, including how much parallelism that is beneficial to use, the timing constraints in the memory, or other constraints, such as operation voltage levels. The plurality of ordered sub-operations, preferably for a read operation, may be selected from: row decoding; column decoding; word line activation; bit line activation, such as local bit line activation and global bit line activation; bit line precharging, such as local bit line precharging and global bit line precharging; memory cell discharging; control of bit line switches, such as local bit line switches and global bit line switches; sense amplifier activation; output multiplexing. The plurality of ordered sub-operations, preferably for a write operation, may be selected from: row decoding; column decoding; storing write value in buffer; bit line activation, such as global bit line and local bit line activation; word line activation; pushing a write value into the memory cell.

As a person skilled would understand, a memory comprises a number of logic functions. The burst access memory may therefore comprise, inter alia, a decoder unit and read and write logic. One example of an embodiment of the presently disclosed burst access memory is shown in FIG. 1A. In this example the burst access memory 100 comprises a decoding unit 108 and a controller 109 for controlling the accesses of a memory array 107 and output multiplexing of a multiplexer 111. The memory array 107 comprises a number of memory macros 104, each memory macro 107 comprising an array of memory cells 101 arranged in rows and columns. Sense amplifiers 112 are arranged after the multiplexer 111 with respect to the memory array 107. In the example there is an initial read memory buffer 110, which is optional. In FIG. 1B the sense amplifiers 112 are arranged before the multiplexer 111. FIG. 1C shows a further embodiment, in which a buffer (registers) can be used for reading and writing values from/to the memory array. In this embodiment the controller 109 controls read, write and select signals. The multiplexer can be used both for input and output.

The memory cells in the memory array may be any suitable memory cell, for example a 4T, 5T, 6T, 7T, 8T bit cell. FIG. 4A discloses an example of a single-port 6T memory cell. FIG. 4B discloses an example of a 8T dual-port memory cell. FIG. 4C discloses an example of a 8T dual-port memory cell.

While the present disclosed burst access memory has a primary burst access mode, it is not excluded that the burst access memory also supports random-accesses. In one embodiment the burst access memory therefore has a first burst read and/or write mode and a second random-access mode. Consequently such a dual-mode memory needs at least some additional logic for handling the random accesses.

The disclosure further relates to a method of operating a burst access memory comprising a plurality of memory macros, each memory macro comprising an array of memory cells arranged in rows and columns. The method comprises generating a plurality of macro accesses to the memory macros. Preferably, the plurality of macro accesses are scheduled to start with a predefined delay in relation to each other. Preferably, each macro access is divided into a plurality of ordered sub-operations.

Preferably, consecutive macro accesses are directed to different memory macros and different columns, wherein data for consecutive memory accesses are arranged in the different memory macros and the different columns to match the consecutive macro accesses. The method may be performed on any embodiment of the presently disclosed burst access memory. The accesses may be read-operations and/or write-operations.

FURTHER DETAILS

1. A burst access memory comprising:
   a memory array comprising a plurality of memory macros, each memory macro comprising an array of memory cells arranged in rows and columns;
   a controller configured to schedule a burst access of the burst access memory by generating a plurality of macro accesses to the memory macros, wherein the plurality of macro accesses are scheduled to start with a predefined delay in relation to each other,
   wherein each macro access is divided into a plurality of ordered sub-operations, and wherein consecutive macro accesses are directed to different memory macros and different columns, wherein data for consecutive macro accesses are arranged in the different memory macros and the different columns to match the consecutive macro accesses.

2. The burst access memory according to item 1, wherein a new macro access is scheduled to start on every clock cycle, every second clock cycle, or every fourth clock cycle, of a clock signal.

3. The burst access memory according to item 2, wherein the plurality of ordered sub-operations are executed in series, wherein each sub-operation starts on every cycle of the clock signal.

4. The burst access memory according to any one of the preceding items, wherein the macro accesses to the memory macros are multi-cycle macro accesses.

5. The burst access memory according to any one of the preceding items, wherein the burst access memory comprises a decoder unit and read and write logic.

6. The burst access memory according to any one of the preceding items, wherein the plurality of memory macros are vertically arranged, wherein bit lines are shared or connectable between columns of the plurality of memory macros.

7. burst access memory according to any one of items 1-5, wherein the plurality of memory macros are horizontally arranged, wherein word lines are shared or connectable between rows of the plurality of memory macros.

8. The burst access memory according to any one of the preceding items, wherein the burst access memory is configured to operate without a registered output read buffer.

9. The burst access memory according to any one of the preceding items, wherein the plurality of ordered sub-operations, preferably for a read operation, are selected from:
   row decoding;
   column decoding;
   word line activation;
   bit line activation, such as local bit line activation and global bit line activation;
   bit line precharging, such as local bit line precharging and global bit line precharging;
   memory cell discharging;
   control of bit line switches, such as local bit line switches and global bit line switches;
   sense amplifier activation;
   output multiplexing.

10. The burst access memory according to any one of the preceding items, wherein the plurality of ordered sub-operations, preferably for a write operation, are selected from:
   row decoding;
   column decoding;
   storing write value in buffer;
   bit line activation, such as global bit line and local bit line activation;
   word line activation;
   pushing a write value into the memory cell.

11. The burst access memory according to any one of the preceding items, wherein the memory cells in each column are connected by at least one local bit line, and wherein the memory cells in each row are connected by a word line, and wherein the local bit line for each column of the plurality of memory macros are connectable to a global bit line connectable to corresponding local bit lines of other memory macros.

12. The burst access memory according to any one of the preceding items, wherein the memory cells in each column are connected by a pair of local bit lines, wherein the pair of local bit lines for each column of the plurality of memory macros are connectable to a pair of global bit lines connectable to corresponding pairs of local bit lines of other memory macros 13. The burst access memory according to any one of items 11 or 12, wherein the memory macros share the global bit lines.

14. The burst access memory according to any one of items 11-13, further comprising bit line switches for controlling connections between the local bit lines and the global bit lines.

15. The burst access memory according to any one of the preceding items, wherein the memory cells in each column are connected by at least one local bit line, and wherein the local bit line for each column of the plurality of memory macros are connectable to a global bit line, further comprising bit line control logic for selectively connecting the local bit lines of different memory macros to the global bit line.

16. The burst access memory according to any one of the preceding items, wherein data read from consecutive macro accesses are time-multiplexed.

17. The burst access memory according to any one of the preceding items, further comprising an output multiplexer synchronized with the plurality of macro accesses such that data read from the consecutive macro accesses are routed to an output, wherein output data of the consecutive macro accesses are delivered to output ports on every clock cycle of the clock signal.

18. The burst access memory according to any one of the preceding items, wherein input and/or output logic has a data width equal to an internal macro data width of data being accessed in each macro access.

19. The burst access memory according to any one of the preceding items, further comprising sense amplifiers and an output multiplexer for selecting read data from the plurality of macro accesses, wherein the sense amplifiers are arranged after the output multiplexer.

20. The burst access memory according to any one of the preceding items, wherein an access latency of the burst access memory is significantly longer than a clock cycle, such as at least two clock cycles, or at least four clock cycles, or at least eight clock cycles, or at least 16 clock cycles.

21. The burst access memory according to any one of the preceding items, wherein the plurality of macro accesses are overlapping in time.

22. The burst access memory according to item 21, wherein the data for consecutive memory addresses is arranged in the different memory macros and the different columns such that no collision of memory macros and bit lines occur for overlapping macro accesses.

23. The burst access memory according to any one of the preceding items, wherein first data is arranged in a first memory macro and a first column, wherein second data is arranged in a second memory macro and a second column, and wherein third data is arranged in a third memory macro and a third column.

24. The burst access memory according to item 23, wherein N:th data is arranged in an N:th memory macro and an N:th column 25. The burst access memory according to any one of the preceding items, wherein the operating frequency is at least 1 GHz, preferably at least 2 GHz, more preferably at least 5 GHz, even more preferably 10 GHz.

26. The burst access memory according to any one of the preceding items, wherein the operating frequency is at least 1 GHz wherein the access latency of a memory macro is at least 3 ns, preferably at least 2 GHz wherein the access latency of a memory macro is at least 1.5 ns, more preferably at least 5 GHz wherein the access latency of a memory macro is at least 600 ps, even more preferably 10 GHz wherein the access latency of a memory macro is at least 300 ps.

27. The burst access memory according to any one of the preceding items, configured to operate with different internal voltage domains, wherein the memory array is supplied with a voltage lower than the rest of the logic of the burst access memory, or wherein the memory array is supplied with a voltage greater than the rest of the logic of the burst access memory.

28. The burst access memory according to any one of the preceding items, wherein the plurality of memory macros, row selection logic and column logic operate at different voltage levels depending on whether a write operation or a read operation is performed.

29. The burst access memory according to any one of the preceding items, wherein the burst access memory has a first burst read and/or write mode and a second random-access mode.

30. The burst access memory according to any one of the preceding items, further comprising a separate initial burst memory buffer, wherein the controller is configured to read data from the separate initial burst memory buffer at every clock cycle during a latency period corresponding to the time it takes for the memory array to deliver read data.

31. The burst access memory according to any one of the preceding items, wherein the memory macros have different sizes.

32. The burst access memory according to any one of the preceding items, wherein the memory macros have different number of rows.

33. A method of operating a burst access memory comprising a plurality of memory macros, each memory macro comprising an array of memory cells arranged in rows and columns, the method comprising the steps of:
generating a plurality of macro accesses to the memory macros, wherein the plurality of macro accesses are scheduled to start with a predefined delay in relation to each other, wherein each macro access is divided into a plurality of ordered sub-operations,
wherein consecutive macro accesses are directed to different memory macros and different columns, wherein data for consecutive memory accesses are arranged in the different memory macros and the different columns to match the consecutive macro accesses.

34. The method of operating a burst access memory comprising a plurality of memory macros according to item 33, wherein the accesses or read-operations.

35. The method of operating a burst access memory comprising a plurality of memory macros according to item 33, wherein the accesses or write-operations.

36. The method of operating a burst access memory comprising a plurality of memory macros according to any one of items 33-35, wherein the burst access memory is the burst access memory of any one of items 1-32.

The invention claimed is:

1. A burst access memory comprising:
a memory array comprising a plurality of memory macros, each memory macro comprising an array of memory cells without read/write logic arranged in rows and columns, wherein the memory cells in each column are connected by at least one local bit line, said array of memory cells and the local bit lines defining the memory macro;
a controller configured to schedule a burst access of the burst access memory by generating a plurality of macro accesses to the memory macros, wherein the plurality of macro accesses are scheduled to start with a predefined delay in relation to each other,
wherein the burst access memory comprises a plurality of global bit lines and bit line switches, wherein each global bit line is connectable to several corresponding local bit lines of the memory macros; and
wherein each macro access is divided into a plurality of ordered sub-operations, and wherein consecutive macro accesses are directed to different memory macros and different columns, wherein data for consecutive macro accesses are arranged in the different memory macros and the different columns to match the consecutive macro accesses.

2. The burst access memory according to claim 1, further comprising an input and/or output multiplexer, wherein the input and/or output multiplexer is shared between the memory macros.

3. The burst access memory according to claim 2, wherein the plurality of global bit lines are connected to the input and/or output multiplexer, or wherein the plurality of global bit lines are connected to read or write circuitry, such as sense amplifiers, that are connected to the input and/or output multiplexer.

4. The burst access memory according to claim 1, wherein a new macro access is scheduled to start on every clock cycle, every second clock cycle, or every fourth clock cycle, of a clock signal.

5. The burst access memory according to claim 1, wherein the macro accesses to the memory macros are multi-cycle macro accesses.

6. The burst access memory according to claim 1, wherein the burst access memory is configured to operate without a registered output read buffer.

7. The burst access memory according to claim 1, wherein the plurality of ordered sub-operations, preferably for a read operation, are selected from:
row decoding;
column decoding;
word line activation;
bit line activation, such as local bit line activation and global bit line activation;
bit line precharging, such as local bit line precharging and global bit line precharging;
memory cell discharging;
control of bit line switches, such as local bit line switches and global bit line switches;
sense amplifier activation;
output multiplexing.

8. The burst access memory according to claim 1, wherein the plurality of ordered sub-operations, preferably for a write operation, are selected from:
row decoding;
column decoding;
storing write value in buffer;
bit line activation, such as global bit line and local bit line activation;
word line activation;
pushing a write value into the memory cell.

9. The burst access memory according to claim 1, wherein at least one of the global bit lines is connectable to multiple local bit lines in the same macro.

10. The burst access memory according to claim 1, wherein data read from consecutive macro accesses are time-multiplexed.

11. The burst access memory according to claim 1, further comprising an input and/or output multiplexer synchronized with the plurality of macro accesses such that data read from the consecutive macro accesses are routed to an output, wherein output data of the consecutive macro accesses are delivered to output ports on every clock cycle of the clock signal, or such that input data delivered ports on every clock cycle of the clock signal from input ports are written to the memory cells in the consecutive macro accesses.

12. The burst access memory according to claim 1, further comprising at least two parallel input and/or output multiplexers, wherein data read from the consecutive macro accesses are alternatingly routed to/from the two parallel input and/or output multiplexers.

13. The burst access memory according to claim 1, wherein data read from the consecutive macro accesses are alternatingly routed to one output multiplexer and/or wherein write data for consecutive macro accesses is alternatingly routed from an input port, or wherein data read from the consecutive macro accesses are alternatingly routed to a plurality of output ports and/or wherein write data is alternatingly routed from a plurality of input ports.

14. The burst access memory according to claim 1, configured to operate with different internal voltage domains, wherein the memory array is supplied with a voltage lower than the rest of the logic of the burst access memory, or wherein the memory array is supplied with a voltage greater than the rest of the logic of the burst access memory.

15. The burst access memory according to claim 1, further comprising a separate initial burst memory buffer, wherein the controller is configured to read data from the separate initial burst memory buffer at every clock cycle during a latency period corresponding to the time it takes for the memory array to deliver read data, or wherein the controller is configured to write data to the separate initial burst memory buffer at every clock cycle during a latency period corresponding to the time it takes to write first data to the memory array.

16. The burst access memory according to claim 1, wherein the memory macros have different sizes.

17. The burst access memory according to claim 1, wherein the controller is configured to generate the plurality of macro accesses to the memory macros in an order based on timing and/or response time of individual memory macro accesses and/or macro access size.

18. The burst access memory according to claim 17, wherein a predefined macro access is skipped at least every second time and/or wherein a number of predefined macro accesses are accessed alternatingly in a sequence of macro accesses.

19. The burst access memory according to claim 1, wherein a timing unit is configured to arrange accesses in an order such that macro accesses taking longer than a predefined access time are skipped at least every second time.

20. A method of operating a burst access memory comprising a plurality of memory macros, each memory macro comprising an array of memory cells without read/write logic arranged in rows and columns, wherein the memory cells in each column are connected by at least one local bit line, said array of memory cells and the local bit lines defining the memory macro, the method comprising the steps of:

generating a plurality of macro accesses to the memory macros, wherein the plurality of macro accesses are scheduled to start with a predefined delay in relation to each other, wherein each macro access is divided into a plurality of ordered sub-operations, and wherein consecutive macro accesses are directed to different memory macros and different columns, wherein data for consecutive memory accesses are arranged in the different memory macros and the different columns to match the consecutive macro accesses.

* * * * *